(12) United States Patent
Kato et al.

(10) Patent No.: US 6,958,200 B2
(45) Date of Patent: Oct. 25, 2005

(54) NICKEL-METAL HYDRIDE STORAGE BATTERY AND ASSEMBLY OF THE SAME

(75) Inventors: Fumio Kato, Moriguchi (JP); Futoshi Tanigawa, Neyagawa (JP); Kohji Yuasa, Chigasaki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 332 days.

(21) Appl. No.: 10/263,885

(22) Filed: Oct. 3, 2002

(65) Prior Publication Data

US 2003/0031929 A1 Feb. 13, 2003

Related U.S. Application Data

(63) Continuation-in-part of application No. PCT/JP01/02873, filed on Apr. 2, 2001.

(30) Foreign Application Priority Data

Apr. 5, 2000 (JP) .............................. 2000-103045
Mar. 29, 2001 (JP) .............................. 2001-096296

(51) Int. Cl.$^7$ ............................................. H01M 4/23
(52) U.S. Cl. ................... 429/223; 429/163; 429/218.1; 429/218.2
(58) Field of Search ..................... 429/163, 218.1, 429/218.3, 223, 218.2

(56) References Cited

U.S. PATENT DOCUMENTS

| | | | |
|---|---|---|---|
| 5,747,186 A | * | 5/1998 | Morishita et al. ............. 429/53 |
| 6,038,642 A | | 7/2000 | Kato et al. |
| 6,574,111 B1 | * | 6/2003 | Gyenes et al. ............. 361/742 |
| 6,887,618 B2 | * | 5/2005 | Shelekhin et al. .......... 429/175 |
| 2004/0265683 A1 | * | 12/2004 | Merill et al. ................. 429/56 |

FOREIGN PATENT DOCUMENTS

| | | | | |
|---|---|---|---|---|
| CN | 1174418 A | 2/1998 | | |
| EP | 0 928 035 A1 | 7/1999 | | |
| JP | 06068805 A | 3/1994 | | |
| JP | 06-283196 | * 10/1994 | .......... | H01M 10/30 |
| JP | 6-283196 A | 10/1994 | | |
| JP | 07-142043 A | 6/1995 | | |
| JP | 07-254430 A | 10/1995 | | |
| JP | 07-326331 A | 12/1995 | | |
| JP | 09045251 A | 2/1997 | | |
| JP | 09-073900 A | 3/1997 | | |
| JP | 10-012237 A | 1/1998 | | |
| JP | 10-247514 A | 9/1998 | | |

(Continued)

*Primary Examiner*—Dah-Wei Yuan
(74) *Attorney, Agent, or Firm*—Akin Gump Strauss Hauer & Feld, LLP

(57) ABSTRACT

In a nickel-metal hydride storage battery comprising: an electrode plate assembly including current collectors on the top and bottom portions; an alkaline electrolyte; and a battery case having a substantially rectangular parallelepiped part for accommodating the electrode plate assembly and the alkaline electrolyte, the capacity degradation due to deep discharge and reverse charge inherent to a nickel-metal hydride storage battery is suppressed by setting the amount of the alkaline electrolyte at 70 to 90% of the volume V of the residual space in the battery represented by the equation (1): $V=S\cdot h-(V1+V2+V3+V4)$ (1), where S is the cross sectional area of the inner space of the substantially rectangular parallelepiped part, h is the height of the electrode plate assembly, V1 is the true volume of the positive electrode plate, V2 is the true volume of the negative electrode plate, V3 is the true volume of the separator, and V4 is the volume of the two current collectors.

8 Claims, 7 Drawing Sheets

FOREIGN PATENT DOCUMENTS

| | | | |
|---|---|---|---|
| JP | 11-097008 A | 4/1999 | |
| JP | 11-135113 A | 5/1999 | |
| JP | 11-149938 A | 6/1999 | |
| JP | 11-154531 * | 6/1999 | ........... H01M 4/32 |
| JP | 11-154531 A | 6/1999 | |
| JP | 11-273671 * | 10/1999 | .......... H01M 10/28 |
| JP | 11-273671 A | 10/1999 | |
| JP | 11-273709 A | 10/1999 | |
| JP | 2000-067910 A | 3/2000 | |

* cited by examiner

F I G. 3
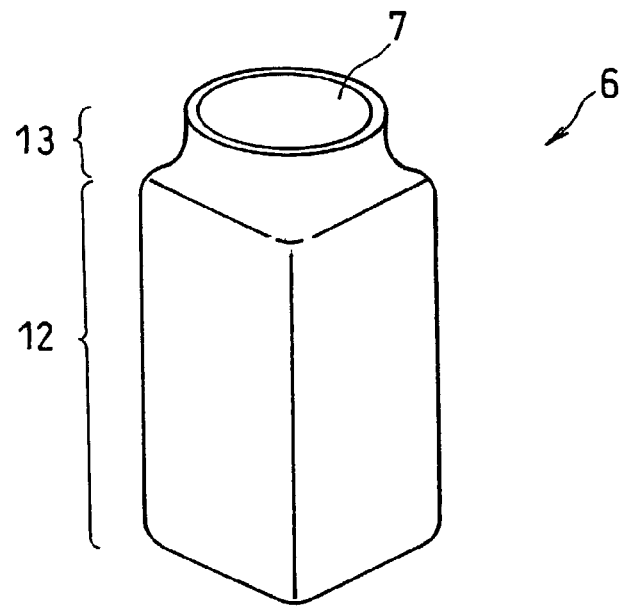
F I G. 4
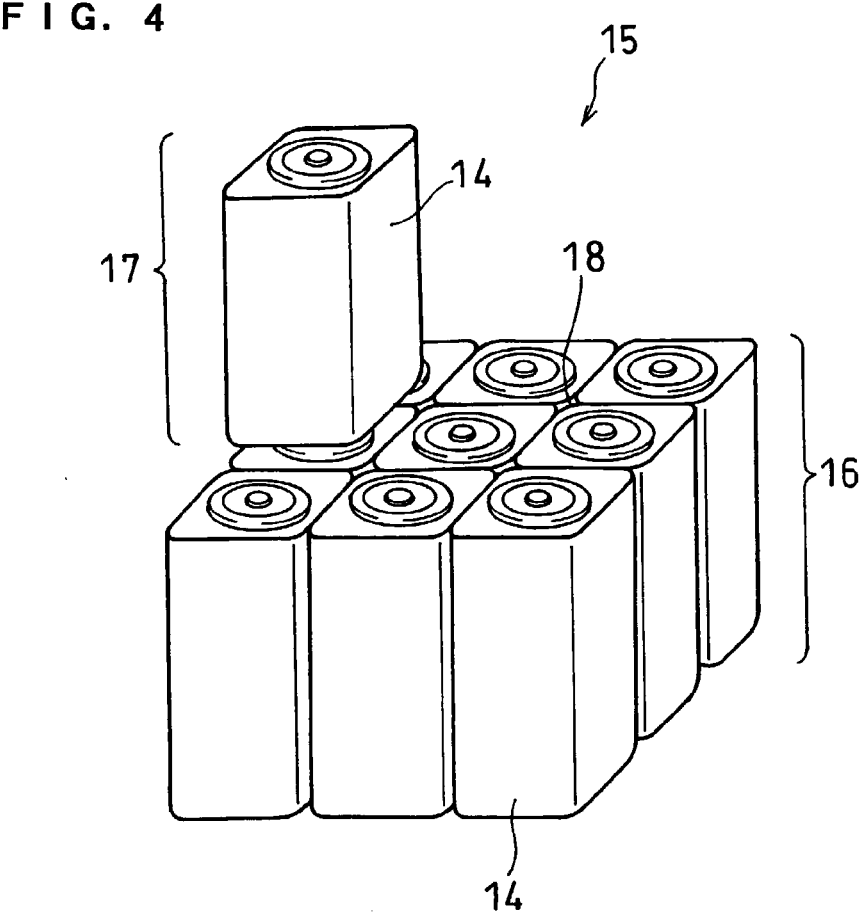

F I G. 5
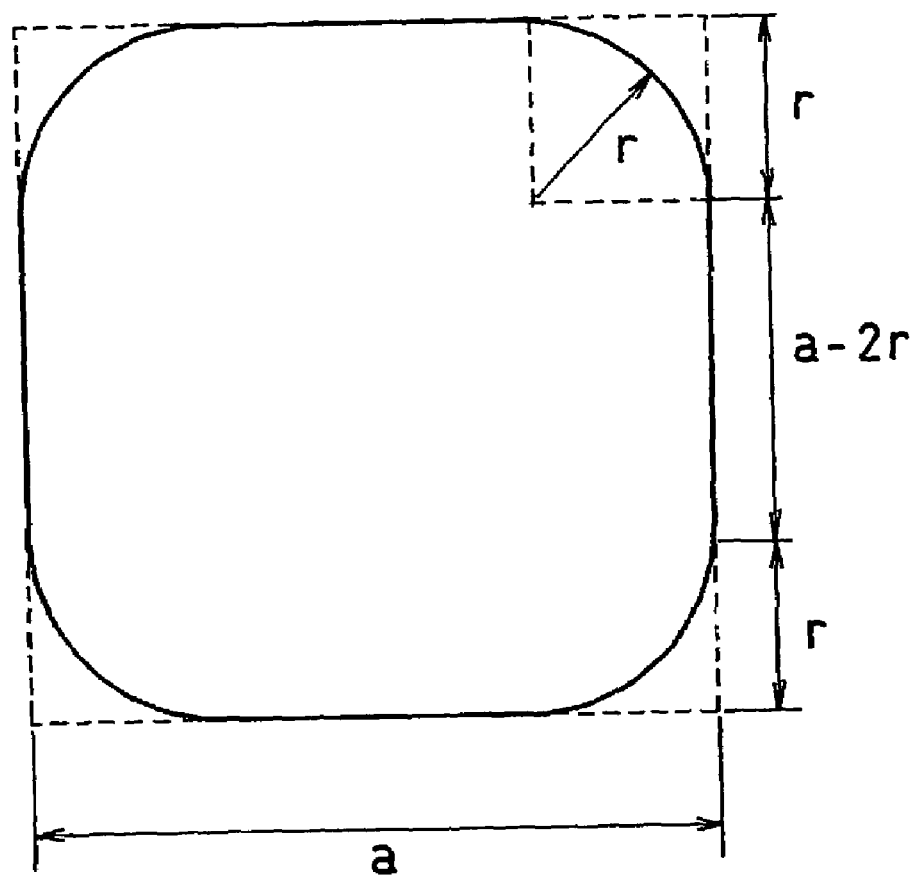

F I G. 8
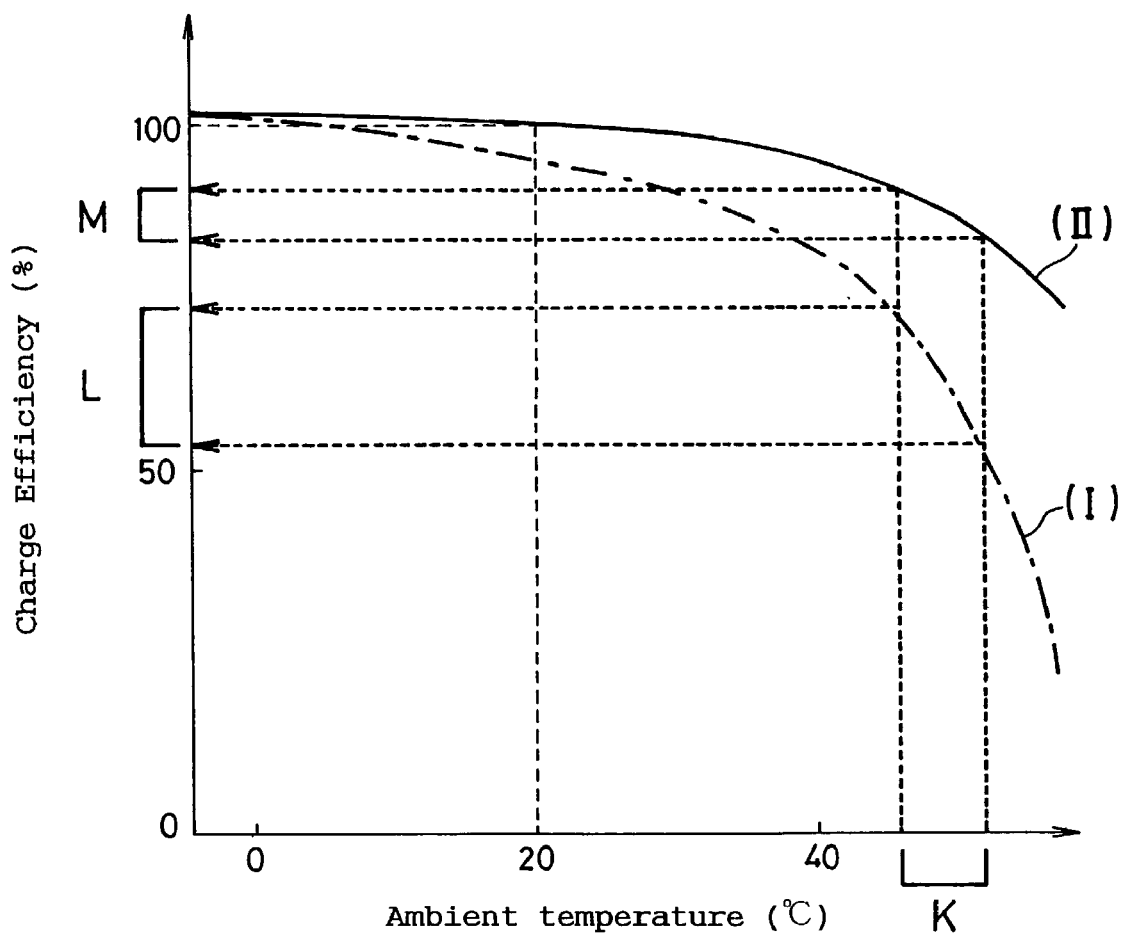

NICKEL-METAL HYDRIDE STORAGE BATTERY AND ASSEMBLY OF THE SAME

CROSS-REFERENCE TO RELATED APPLICATIONS

This application is a continuation-in-part of International Application No. PCT/JP01/02873, filed Apr. 2, 2001, the disclosure of which is incorporated herein by reference.

BACKGROUND OF THE INVENTION

With the widespread proliferation of cellular phones and notebook personal computers in recent years, there is a strong desire for small-sized secondary batteries with high capacity. Under such background, nickel-metal hydride storage batteries with high reliability and high capacity have been rapidly spread. Meanwhile, a nickel-cadmium battery which includes an aqueous electrolyte and is inexpensive is commonly employed as the secondary battery used for power tools such as electrical drills and electrical screwdrivers because the importance is put on applicability to super quick charge and large current discharge. Recently, however, taking environmental concerns into account, the use of nickel-metal hydride storage battery without cadmium has been adopted instead of the nickel-cadmium battery with negative electrode containing cadmium. Nickel-metal hydride storage battery comprises a positive electrode plate comprising a nickel porous substrate or the like retaining a positive electrode active material mainly composed of nickel hydroxide, a negative electrode plate comprising a punched metal or the like retaining a negative electrode material mainly composed of a hydrogen storage alloy, a separator interposed between the positive and negative electrode plates and an alkaline electrolyte.

In the nickel-cadmium battery, a sintered type positive electrode plate is widely used because it is suitable for large current discharge and has good durability. The sintered type positive electrode plate is produced by impregnating a sintered nickel substrate with nickel hydroxide. The sintered substrate within the positive electrode plate also contains a small amount of cadmium. The cadmium is substituted for nickel ions within the crystal of the nickel hydroxide, or exists outside of the crystal of the nickel hydroxide as cadmium hydroxide.

In the cadmium ions substituted for the nickel ions within the crystal, the bivalent state is most stable and the valence does not vary even during discharge. The cadmium ions have an effect to suppress the swell and degradation of the positive electrode plate because the cadmium ions suppress increase in the valence of the nickel ions to about tetravalent in charge reaction and also suppress the reaction which produces γ-nickel oxyhydroxide (effect 1).

The cadmium hydroxide which exists outside of the crystal of the nickel hydroxide has an effect to increase the overvoltage of the oxygen generation reaction during the charge of the positive electrode plate to improve the charge efficiency (effect 2). It is considered that this involves the dissolution and redeposition of the cadmium hydroxide, but its detailed mechanism is not known yet.

The cadmium hydroxide also functions as antipolar material. To be more specific, when the positive electrode plate is overdischarged, cadmium hydroxide causes a reductive reaction:

$$Cd(OH)_2 + 2e^- \rightarrow Cd + 2OH^-$$

$$\Delta E = -0.80 \text{ V (vs SCE)}$$

thereby, the effect to suppress hydrogen generation reaction on the positive electrode plate:

$$2H_2O + 2e^- \rightarrow H_2 + 2OH^-$$

$$\Delta E = -0.82 \text{ V (vs SCE)}$$

can also be obtained (effect 3).

As described above, the cadmium contained within the positive electrode of the nickel-cadmium battery along with nickel exhibits a superior effect. When the nickel-metal hydride storage battery is used instead of the nickel-cadmium battery from environmental concerns, however, it is necessary to avoid the use of cadmium in the positive electrode plate.

Accordingly, in the nickel-metal hydride storage battery, the ions of zinc or Group II elements such as magnesium having almost the same size as a nickel ion are contained in the crystal of nickel hydroxide included in the positive electrode plate in stead of the use of cadmium. The effect 3 as the antipolar material cannot be expected from these metals, but the effect 1 to suppress the swell and degradation of the positive electrode plate can be realized.

The nickel hydroxide containing metal ions such as zinc ion and magnesium ion can be filled into a substrate by immersing a sintered substrate into an aqueous solution of nickel nitrate containing zinc ions or magnesium ions and subsequently into a strongly alkaline solution. In this case, however, there arise problems that zinc hydroxide deposited outside of the crystal of nickel hydroxide is dissolved into the strongly alkaline solution or, although the details are not known, that the filling factor of the positive electrode active material is lowered because the bulk density of the active material obtained by containing magnesium ions is reduced.

Therefore, the following method is adopted to obtain the non-sintered positive electrode plate: spherical solid solution nickel hydroxide particles with high bulk density in which the ions of Group II metals are contained are prepared beforehand by reactive crystallization process in which pH, temperature and the like in the reaction vessel are controlled, and the resultant particles are filled into a foamed nickel substrate. According to this method, an effect to suppress the swell and the degradation of the positive electrode plate can be obtained and, at the same time, a positive electrode plate with higher capacity than conventional nickel-cadmium batteries can be obtained.

In order for the nickel-metal hydride storage battery to obtain the effect 2 to increase the overvoltage of the oxygen generation reaction, a trace amount of oxide of rare earth element such as yttrium oxide ($Y_2O_3$), ytterbium oxide ($Yb_2O_3$), lutetium oxide ($Lu_2O_3$) or erbium oxide ($Er_2O_3$) is added to the solid solution nickel hydroxide particles instead of cadmium hydroxide. Particularly, inexpensive yttrium oxide, which is abundant in reserve, is mostly used.

In the secondary batteries for power tools which require excellent large current discharge characteristic, various improvements in the current collecting system are necessary. For instance, there are proposed a tabless type positive electrode plate having an exposed portion of a core member (the portion where active material is not filled) at the upper or lower part thereof, the improvements in the shape of the current collector and the welding portion, and the like. It is also necessary to adopt a relatively rigid battery case and a gas exhaustion valve (valve of safety vent) with a great working pressure in order to cope with the increase in the internal pressure of the battery along with the super rapid charge.

The voltage of the nickel-metal hydride storage battery per cell is about 1.2 V. Accordingly, in order to provide the necessary voltage, an assembly of 10 to 12 batteries connected in series is usually employed for power tools. Further, in order to avoid increasing the cost and the weight and the volume of the power circuit, the protection circuit to prevent overdischarge is mostly not set in power tools. Consequently, it is surmised that the battery keeps discharge until the motor of the tool fails, specifically, until the voltage of the assembly is lowered to about 1 to 2 V. In such case, each of the cells go into an overdischarged state where the voltage is as low as 0.1 to 0.2 V even if each of the cells constituting the assembly has a uniform capacity.

At this stage, usually, a cobalt component such as metallic cobalt, cobalt hydroxide or cobalt monoxide is also added to the positive electrode plate containing nickel hydroxide as a conductive agent. A part of the β-cobalt component is electrochemically oxidized into cobalt oxyhydroxide in the initial charge after the production of the battery to form a conductive network. When the battery is kept discharged until its voltage becomes as low as the above figures, the potential of the positive electrode plate becomes lower than the trivalent/bivalent equilibrium potential of the β-cobalt oxyhydroxide (about 0.9 to 1.0 V in terms of battery voltage), and the β-cobalt oxyhydroxide is reduced to $HCoO_2^-$ (cobalt complex ion), which is soluble in alkaline solution. This results in a local damage to the conductive network and a gradual reduction in the battery capacity.

In the nickel-metal hydride storage battery, a reducing atmosphere is maintained by gas phase hydrogen which is in an equilibrium state with hydrogen absorbed in a hydrogen storage alloy. Such reducing atmosphere facilitates the reduction of β-cobalt oxyhydroxide mentioned above and accelerates the damage to the conductive network.

Additionally, an initial variation and a variation with time which occur during the production process in the battery capacity, or a temperature variation in the assembly due to uneven temperature atmosphere is inevitable. Accordingly, repeated discharge of the assembly consisting of a plurality of batteries connected in series causes deterioration of the batteries due to the reverse charge. Since the nickel-metal hydride storage battery is designed to be controlled by the capacity of the positive electrode in the case of using a negative electrode comprising a common $MmNi_5$ type alloy, hydrogen gas occurs by the polarity inversion of the positive electrode plate in the reversely charged battery. Particularly, when the battery is discharged with large current, hydrogen absorption by the negative electrode alloy is so slow that the internal pressure of the battery increases rapidly, and the gas exhaustion valve is activated. Subsequently, the electrolyte and the hydrogen gas are released to decrease the battery capacity significantly.

As mentioned above, when conventional nickel-metal hydride storage batteries are applied to power tools or the like, there is a problem that the cycle life of the battery, especially as an assembly, is poor.

BRIEF SUMMARY OF THE INVENTION

The present invention can provide a solution to a problem of capacity degradation due to deep discharge and reverse charge inherent to a nickel-metal hydride storage battery often used as an assembly like above.

The present invention relates to a nickel-metal hydride storage battery comprising (i) an electrode plate assembly comprising: a positive electrode plate comprising spherical nickel hydroxide particles having cobalt oxide on the surface thereof, yttrium oxide particles and a porous nickel substrate retaining both of the particles; a negative electrode plate containing a hydrogen storage alloy; a separator interposed between the positive and negative electrode plates, in which the electrode plates and the separator are spirally wound; and current collectors of one polarity and the other polarity being located respectively on the top and bottom of the spirally wound electrode plates and separator, (ii) an alkaline electrolyte and (iii) a battery case having a substantially rectangular parallelepiped part for accommodating the electrode plate assembly and the alkaline electrolyte, the amount of the alkaline electrolyte being 70 to 90% of the volume V of the residual space in the battery given by the equation (1):

$$V = S \cdot h - (V1 + V2 + V3 + V4) \tag{1}$$

where S is the cross sectional area of the inner space of the substantially rectangular parallelepiped part, h is the height of the electrode plate assembly, V1 is the true volume of the positive electrode plate, V2 is the true volume of the negative electrode plate, V3 is the true volume of the separator, and V4 is the volume of the two current collectors.

It should be noted that the term true volume of the positive electrode plate, the negative electrode plate and the separator means the volumes exclusive of the pores in the positive electrode plate, the negative electrode plate and the separator which are porous respectively.

In this invention, it is preferable that the volume v of the internal space of the substantially rectangular parallelepiped part satisfies the following equation:

$$v \leq S \cdot h \times 1.1.$$

Since the above-mentioned nickel-metal hydride storage battery uses the spherical nickel hydroxide particles having cobalt oxide on the surface thereof for the positive electrode active material, corruption of the conductive network during overdischarge is suppressed. Moreover, the coexistence of yttrium oxide within the positive electrode improves the charge efficiency of the positive electrode, resulting in suppression of the variation in the state of charged batteries in the assembly at high level. Further, the portion which accommodates the electrode plate assembly and alkaline electrolyte is made into a rectangular parallelepiped shape; thereby, the space in the battery is enlarged and, at the same time, the amount of electrolyte contained therein is optimized. Thereby, it is possible to reduce the increase of the internal pressure along with the hydrogen generation caused by the reverse charge of the battery and to improve battery cycle life.

It is preferable that the above-mentioned nickel-metal hydride storage battery is equipped with a gas exhaustion valve with a working pressure of $1.9 \times 10^6$ to $4.0 \times 10^6$ Pa. Such battery equipped with a gas exhaustion valve does not easily release the electrolyte and the hydrogen gas even if the inner pressure of the battery is increased due to reverse discharge. Therefore, deterioration of the cycle life of the assembly can be significantly suppressed. In this case, hydrogen is accumulated within the battery, but hydrogen explosion does not occur because the gas contained in the battery consists of almost only hydrogen; therefore, safety can be ensured. Hydrogen explosion due to the mixture of hydrogen and oxygen occurs only when the hydrogen content is 4 to 75 volume %.

It is preferable that the aforementioned battery case comprises a bottomed case having a circular opening, and the opening is sealed with a disc-shaped seal plate, with the edge of the opening crimping onto the periphery of the seal plate. It is preferable that the periphery of the aforementioned opening is, prior to the sealing, deformed into a short and substantially cylindrical shape with the opening at the top surface. In this way, it is possible to employ the same sealing technique as the one used in conventional cylindrical batteries, which facilitates the assurance of reliability of the sealed portion and battery productivity.

It is preferable that the cross section of the substantially rectangular parallelepiped part has a substantially square outer shape with four curved or chamfered corners, and r/a ratio is 0.40 or less when the distance between opposite sides of the substantial square is represented by a and the length of a straight segment of the side is represented by a−2r. In this way, when the assembly is constructed, the heat dissipation from each of the batteries is facilitated to prevent the temperature distribution in the assembly from becoming uneven. Thereby, variation in the charge capacity of the batteries and variation in the state of the charged batteries can be suppressed; thus, the occurrence of reverse charge can be suppressed.

It is preferable that the amount of the aforementioned cobalt oxide is 2 to 15 parts by weight per 100 parts by weight of the nickel hydroxide.

It is preferable that the amount of the above-mentioned yttrium oxide particles is 0.5 to 5.0 parts by weight per 100 parts by weight of the spherical nickel hydroxide particles having the cobalt oxide on the surface thereof.

It is preferable that the aforementioned cobalt oxide is at least one selected from the group consisting of cobalt oxide having a cobalt valence of 2.0 or more and cobalt hydroxide.

Moreover, it is particularly preferable that the above-mentioned cobalt oxide comprises cobalt oxide having a cobalt valence over 3.0.

The present invention further relates to an assembly comprising a plurality of the above-mentioned nickel-metal hydride storage batteries arranged such that at least one side face of each of the batteries faces a side face of another one of the batteries.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE SEVERAL VIEWS OF THE DRAWING

FIG. 3 is an oblique view of one example of a battery case (bottomed case) in accordance with the present invention before sealing of the opening.

FIG. 4 is an oblique view illustrating one example of the arrangement of an assembly comprising a plurality of nickel-metal hydride storage batteries of the present invention.

FIG. 5 is a schematic sectional view of one example of a battery case suitable to form air passages for heat dissipation.

FIG. 8 is a graph showing the relation between the ambient temperature and the charge efficiency of a battery (I) having a positive electrode plate without yttrium oxide and a battery (II) having a positive electrode plate containing yttrium oxide.

DETAILED DESCRIPTION OF THE INVENTION

Figure 1:
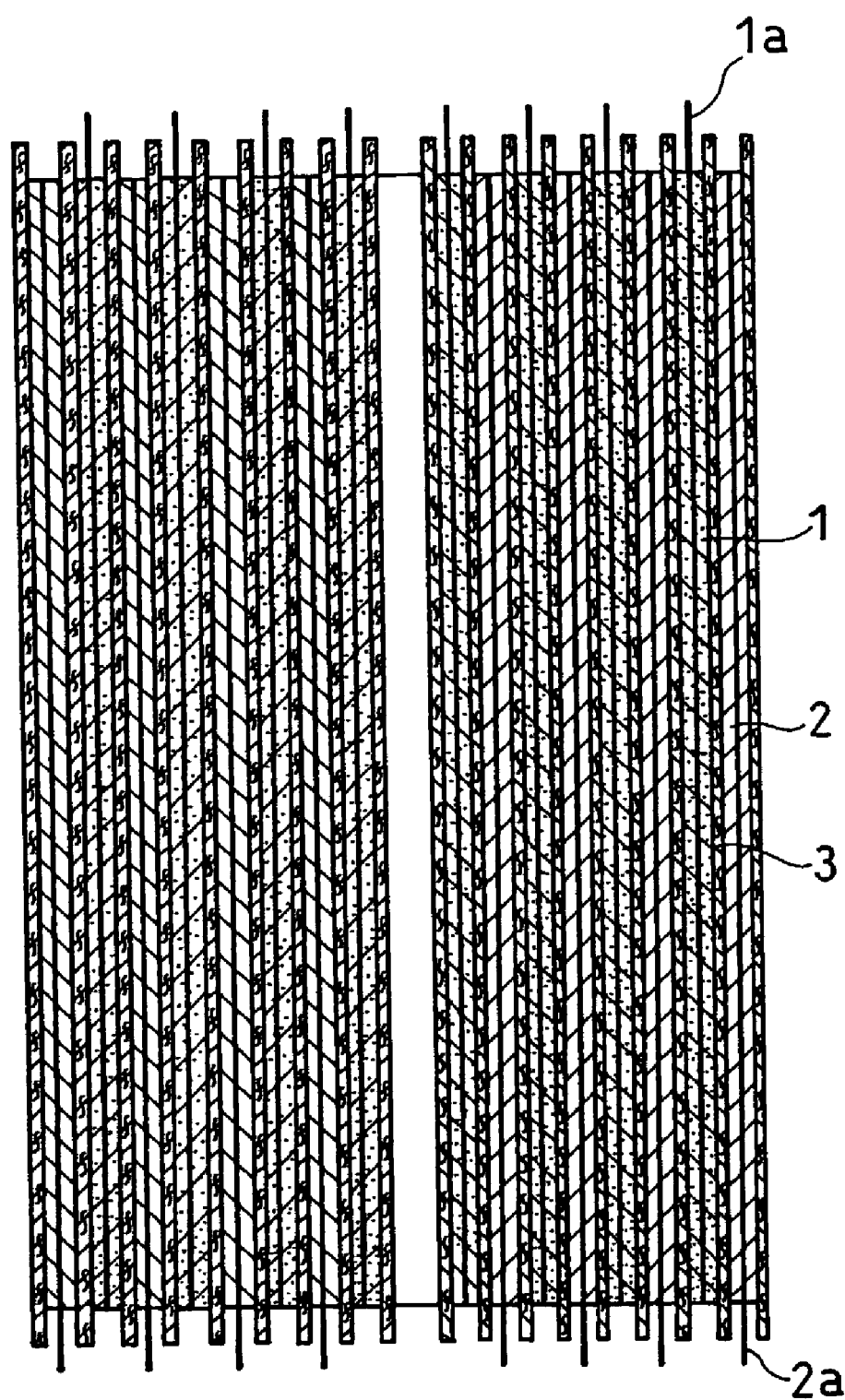
FIG. 1 is a vertical cross section of one example of an electrode plate assembly before current collectors are welded thereon in accordance with the present invention.

First, the positive electrode active material suitably used for a nickel-metal hydride storage battery of the present invention is described.

The present invention employs spherical nickel hydroxide particles as the main component of the active material. The spherical nickel hydroxide particles, which have a β-type crystalline structure ($CdI_2$ structure), can be obtained as a solid solution containing a trace amount of element such as cobalt, zinc or magnesium by a well-known reactive crystallization process. It is preferable in the present invention that the amount of the metal element in the solid solution except for Ni is 2 to 10 mol % of all the metal elements. Incidentally, nickel hydroxide includes a solid solution nickel hydroxide in the present invention.

The nickel hydroxide particles used in the present invention have a surface layer comprising cobalt oxide. As the above-mentioned cobalt oxide, cobalt oxide having a cobalt valence of 2.0 or more and cobalt hydroxide can be employed. Among them, it is preferable to use cobalt hydroxide and cobalt oxide having a cobalt valence over 2.0, and it is most preferable to employ cobalt oxide having a cobalt valence over 3.0 (γ-cobalt oxyhydroxide and the like) because it is not easily reduced by overdischarge.

The nickel hydroxide particles having a surface layer comprising cobalt oxide having a cobalt valence over 3.0 can be obtained as follows. First, a surface layer of cobalt hydroxide is formed on the surface of nickel hydroxide particles. Secondly, the surface is made wet with an alkaline solution. Then, the particles are dried with hot air while heating them desirably using microwave irradiation to give nickel hydroxide particles having a surface layer comprising cobalt oxide having a cobalt valence over 3.0.

The above method is disclosed in Japanese Laid-Open Patent Publication No. Hei 11-97008, of which the inventors are the present inventors, and U.S. Pat. No. 6,083,642. Because the surface layer of the particles obtained through the treatment under a severe oxidation condition like above comprises an oxide containing a high valent cobalt, it is less susceptible to overdischarge and the conductive network is maintained over a long period of time.

Nickel hydroxide particles covered with cobalt oxide with a cobalt valence of 2.0 to 3.0 or cobalt hydroxide can also be produced by a method described in Japanese Laid-Open Patent Publications No. Hei 9-73900 and No. Hei 10-12237. The effect to delay the damage to the conductive network can also be seen in the thus obtained active material particles. Details on reasons for this effect are not known, but it is considered to be because the first charge or the overcharge during the use of the battery produces cobalt oxide with cobalt of higher valence and the above effect may be maintained.

In this invention, it is preferable that the amount of the cobalt oxide which forms the surface layer is 2 to 15 parts by weight per 100 parts by weight of the nickel hydroxide.

The present invention uses spherical nickel hydroxide particles having cobalt oxide on the surface thereof with yttrium oxide particles. Yttrium oxide is known as a component which increases the overvoltage of the oxygen generation reaction at the positive electrode. In the positive electrode added with the yttrium oxide particles, the charge efficiency is improved and the improvement in the high temperature storage characteristic is also seen.

It is preferable that the amount of the yttrium oxide particles is 0.5 to 5.0 parts by weight per 100 parts by weight of the nickel hydroxide particles having the cobalt oxide on the surface thereof.

Although the choice of a production method of the positive electrode plate using these particulate positive electrode materials is discretionary, for instance, a method in which a slurried positive electrode mixture containing the above-mentioned positive electrode materials is prepared and the mixture is directly filled into a porous nickel substrate is the easiest way and preferable.

As the porous nickel substrate, highly porous non-woven nickel fabric, foamed nickel sheet or the like can be employed. Among them, foamed nickel sheet is most preferable because a positive electrode with high capacity is easily obtained.

On the other hand, the negative electrode can be obtained, for example, by applying a negative electrode mixture containing a hydrogen storage alloy to a nickel-plated iron punched metal, followed by drying and pressure molding.

These electrode plates are spirally wound with a separator interposed therebetween so as to constitute an electrode plate assembly which is tightly wound. Herein, it is difficult to significantly improve the cycle life characteristic even if the electrode plate assembly like this is accommodated in a conventional cylindrical battery case. This is because the increase in the internal pressure of the battery becomes very large in such structure when the reverse charge of the battery occurs.

In order for the electrode plate assembly to exert its full performance, it is necessary to choose an appropriate case and to make the amount of electrolyte appropriate. To be more specific, it is effective that a battery case having rectangular solid shaped internal space whose cross section is in a substantially square shape accommodates the above-mentioned electrode plate assembly. Because such structure significantly reduces the increase in the internal pressure during the reverse charge mentioned above. However, when the electrolyte accounts for 95% or more of the volume of the residual space in the battery, like conventional cylindrical batteries, the battery cannot exhibit its full performance.

In the present invention, it is important that the amount of electrolyte to be contained in the battery is 70 to 90% of the volume V of the residual space in the battery defined by the above equation (1). If the amount of electrolyte exceeds 90% of the volume V of the residual space in the battery, reverse charge is likely to occur, a large amount of gas is to be released outside the battery due to a large increase of the internal pressure during overcharge, or the cycle life characteristic tends to be impaired significantly due to the leak-out of the electrolyte. If the amount of electrolyte is less than 70% of the volume V of the residual space in the battery, the discharge characteristic, which is most important to batteries especially for power tools, tends to be insufficient.

It is preferable that the battery case having a substantially rectangular parallelepiped part is a bottomed case. And its opening can be sealed by laser welding or the like with a quadrate seal plate equipped with a gas exhaustion valve and an external terminal. The opening can also be crimp-sealed in the same manner as that of the conventional cylindrical batteries, where the edge of the opening of the case is crimped onto the periphery of the seal plate. In that case, it is preferable that the periphery of the opening of the battery case is deformed into a short and substantially cylindrical shape with the opening at the top surface beforehand, thereby to improve reliability and productivity of the battery.

In addition, it is preferable to set the strength of the battery case having a substantially rectangular parallelepiped part quite high, in order for the battery case to bear the pressure of $1.9 \times 10^6$ Pa or more because the deformation accompanied by the increase of the internal pressure is more likely to occur in the battery case having a substantially rectangular parallelepiped part than the cylindrical battery case.

FIG. 1 is a vertical cross section of one example of an electrode plate assembly before current collectors are welded on the top and bottom. In FIG. 1, a positive electrode plate 1, a negative electrode plate 2 and a separator 3 interposed between both of the electrode plates are spirally wound into a winding. The end portions of the positive and negative electrode plates are respectively protruded at the top and bottom of the winding. The protruded portion of the positive electrode plate 1 exposes a positive electrode core member 1a which is uncovered with the positive electrode mixture and positioned on one of the top and bottom of the winding. The protruded portion of the negative electrode plate 2 exposes a negative electrode core member 2a which is uncovered with the negative electrode mixture and positioned on the other of the top and bottom of the winding. These can be welded to flat-shaped current collectors disposed on the top and bottom of the winding.

Figure 2:
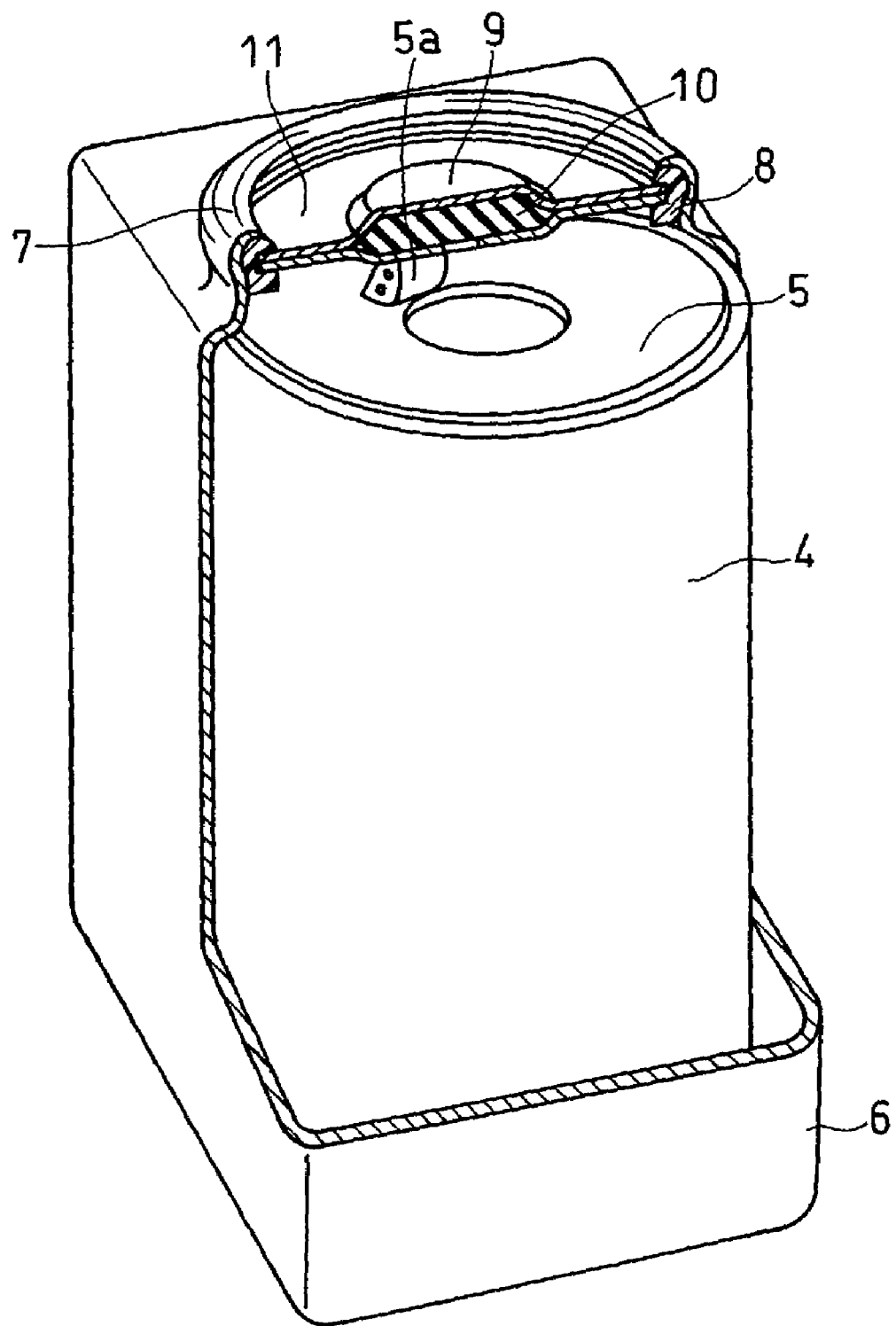
FIG. 2 is a partially sectional view illustrating the internal structure of one example of a nickel-metal hydride storage battery in accordance with the present invention.

FIG. 2 is a partially sectional view illustrating the internal structure of one example of a nickel-metal hydride storage battery in accordance with the present invention. In FIG. 2, a positive electrode current collector 5 is welded on the top face of the winding 4. Also, though not shown in FIG. 2, a negative electrode current collector is welded on the bottom face of the winding 4. The electrode plate assembly is inserted into a battery case 6 having a substantially rectangular parallelepiped part. A circular opening 7 is provided on the top portion of the battery case 6. The opening 7 is sealed with a seal plate 11, equipped with an external terminal 9 and a safety vent system comprising a gas exhaustion valve 10 (rubber valve) by crimping the edge of the opening 7 onto the periphery of the seal plate 11 via an insulating gasket 8. A lead wire 5a of the current collector 5 is connected to the lower portion of the seal plate 11. A current collecting plate of the negative electrode, which is not shown in the FIG. 2, is connected to the inner bottom of the battery case 6. Incidentally, an electrolyte is omitted in FIG. 2.

FIG. 3 is an oblique view of the battery case 6 (bottomed case) before the sealing of the opening 7. A short and substantially cylindrical end portion 13 with the opening 7 at the top is provided on one end of the substantially rectangular parallelepiped part 12. If a battery case like this is adopted, a similar sealing technique as that of the conventional cylindrical batteries is easily applied.

FIG. 4 shows one example of the arrangement of an assembly 15 comprising nickel-metal hydride storage batteries 14 of the present invention. The assembly 15 has a lower tier 16 consisting of nine cells arranged three by three and an upper tier 17 consisting of one cell, which totals 10 cells. The structure of the top portion of each of the batteries is simplified in FIG. 4. Incidentally, FIG. 4 shows an assembly where top portions of all batteries are disposed upward for the sake of clarity, but in many case, batteries in an assembly are disposed alternately in opposite direction to facilitate connecting the batteries in series with leads or the like. The one cell of the upper tier 17 is placed in the handle portion of the assembly 15. Most power tools accommodate a plurality of batteries. In order to efficiently place a plurality of batteries in a given space, it is effective to make the shape of the battery into a substantially rectangular solid like the present invention.

Without the gap between the batteries, however, it is difficult to dissipate heat generating during charge and discharge; thus, the temperature varies depending on the location of the batteries, leading to the easy occurrence of variations in charge characteristic and discharge characteristic. In order to prevent this, it is effective to make the cross section of the battery case into a substantially square shape having four curved or chamfered corners. In this case, air passages 18 for heat dissipation can be provided in the battery assembly 15 as shown in FIG. 4. And the temperature difference between batteries can be greatly reduced.

FIG. 5 is a schematic sectional view of one example of a battery case suitable to form air passages for heat dissipation. In FIG. 5, the transverse sectional view is substantially square with four curved corners. If the curved portion is too large, however, the shape of the case will become closer to a cylindrical shape and advantages brought by using the battery case with a substantially rectangular parallelepiped part wanes. From this point of view, it is preferable that r/a ratio is set at 0.40 or less when the distance between opposite sides of the substantial square of the transverse cross section of the battery case is represented by "a" and the length of a straight segment of the side is represented by "a−2r".

The present invention is described in detail hereinafter based on Examples.

EXAMPLE 1

Nickel-metal hydride storage batteries and assemblies thereof in accordance with the present invention were produced, and cycle life characteristics, when they were put under the hard charge/discharge conditions, were examined in the following procedure. In this example, the effect on the cycle life induced by cobalt valence in cobalt oxide attached to the surface of the nickel hydroxide particles in the positive electrode active material and the shape of the battery case was examined by setting the working pressure of the gas exhaustion valve at various levels.

The positive electrode plates and batteries were produced in the following steps.

(i) Preparation of Solid Solution Nickel Hydroxide Particles

First, solid solution nickel hydroxide particles were prepared using a well-known reactive crystallization process. An aqueous solution (a) of sodium hydroxide was prepared. An aqueous ammonia solution (b) dissolving nickel sulfate, which is to produce ammine complex ion, as a main solute and zinc sulfate and cobalt sulfate as minor solutes was prepared. The solution (a) and (b) were mixed while adjusting pH of the mixed solution with an aqueous ammonia, so as to precipitate spherical solid solution nickel hydroxide particles. The particles were heated in another aqueous sodium hydroxide solution to remove sulfate ion, and the resultant were washed and dried.

(ii) Formation of Surface Layer Comprising Cobalt Hydroxide

The above-mentioned solid solution nickel hydroxide particles after dried were introduced into an aqueous solution (c) of cobalt sulfate. An aqueous solution (d) of sodium hydroxide was added gradually to the solution (c) with stirring. The resultant solution was kept stirred while adjusting pH thereof to 12 at 35° C. This process deposited mainly β-type cobalt hydroxide on the particle surface to give solid solution nickel hydroxide particles (R) having cobalt hydroxide on the surface thereof. The amount of the cobalt hydroxide was adjusted to be 5 parts by weight per 100 parts by weight of the solid solution nickel hydroxide.

(iii) Oxidation of Surface Layer

After the solid solution nickel hydroxide particles (R) having cobalt hydroxide on the surface thereof were made wet with an aqueous solution containing 48 wt % of sodium hydroxide, they were put into a drying equipment and heated by microwave irradiation while the temperature of the wall of the equipment was kept at 110° C. Oxygen was then introduced into the equipment to dry out the particles. According to this process, the surface layer was turned into cobalt oxide with a higher oxidation state mainly composed of γ-cobalt oxyhydroxide, and the color of the particles was changed to indigo. The obtained particles were washed and dried so as to obtain solid solution nickel hydroxide particles (P) having cobalt oxide with a cobalt valence over 3.0 on the surface thereof.

Besides the above step, solid solution nickel hydroxide particles (R) having cobalt hydroxide on the surface thereof were introduced into a batch fluidized drier whose jacket temperature was kept at 80° C. The particles were fluidized while an aqueous solution containing 25 wt % of sodium hydroxide was sprayed to the particles, and further hot air was continuously supplied thereto. The particles obtained in this step were washed and dried to give solid solution nickel hydroxide particles (Q) having, on the surface thereof, cobalt oxide with a cobalt valence near 2.9.

(iv) Production of Positive Electrode Plate

Positive electrode plates were produced using the obtained active material particles "P", "Q" and "R" for the active material. For comparison, active material particles (S) comprising solid solution nickel hydroxide particles without the surface layer of cobalt oxide but a cobalt hydroxide powder was added thereto in the same ratio as the active material particles "P", "Q" and "R", that is, 5 parts by weight of cobalt hydroxide powder was added to 100 parts by weight of solid solution nickel hydroxide particles were prepared.

Then, one part by weight of yttrium oxide particles were respectively added to 105 parts by weight of each of the active material particles "P", "Q", "R" and "S" and mixed so as to give a slurry, and they were respectively filled into a foamed nickel substrate having a thickness of 1.2 mm. After drying the substrate filled with the active material, it was rolled out to a thickness of 0.6 mm and cut into a predetermined size so as to yield a positive electrode plate with a theoretical capacity of 3000 mAh. An exposed portion of a core member (the portion where active material is not filled) was provided at the upper end portion of the above positive electrode plate to make a tabless type positive electrode plate. The positive electrode plates produced using the active material particles "P", "Q", "R" and "S" were denoted as the positive electrode plates "1(Y)", "2(Y)", "3(Y)" and "4(Y)".

(v) Production of Battery

Each of the obtained positive electrode plates "1(Y)", "2(Y)", "3(Y)" and "4(Y)" and a tabless type negative electrode plate which had an exposed portion of a core member at the lower end portion thereof, contained a $MmNi_5$ type hydrogen storage alloy (Mm: misch metal) and had a theoretical capacity about 1.5 times that of the positive electrode plates, were spirally wound with a hydrophilic separator interposed therebetween. Flat ring shaped nickel current collectors were welded on the top and bottom faces of the wound electrode plates to obtain an electrode plate assembly.

Then, there were prepared a nickel-plated stainless steel battery case A having a substantially rectangular parallelepiped part whose cross section has substantially square outer and inner shapes and a cylindrical battery case B having an outer diameter of 22.5 mm used for conventional batteries F-SC. The inner and outer dimensions of the cross section of the battery case A were made the same as the inner and outer diameters of the battery case B. Further, the substantially rectangular parallelepiped part of the battery case A were made to have a cross section with four corners arc-shaped with an outer radius r of 7.5 mm. In this case, r/a ratio, the ratio of the radius r to the outer dimension a of the battery case A equals to 0.33. Furthermore, the height of the battery case A was made the same as that of the cylindrical case B, and a short and cylindrical end portion including a circular opening was provided on the top of the battery case A.

There were prepared four seal plates each having gas exhaustion valves with the following working pressure:

a: $1.47 \times 10^6$ Pa;
b: $1.96 \times 10^6$ Pa;
c: $2.94 \times 10^6$ Pa; and
d: $3.92 \times 10^6$ Pa.

As the electrolyte, an alkaline aqueous solution of 7 to 8 N dissolving mainly potassium hydroxide was used. This electrolyte was injected into the battery case after the steps of inserting the electrode plate assembly and connecting the terminals with the current collectors, and the opening was sealed. At this time, the amount of electrolyte in the battery using battery case A was set at 80% of the volume V of the residual space in the battery given by the equation (1) mentioned above. On the other hand, in the battery using battery case B, the amount of electrolyte was set at 95% of the volume V' of the residual space in the battery, which is practical in general purpose batteries. Incidentally, there is the following relation:

$$V' = S' \cdot h - (V1 + V2 + V3 + V4),$$

where V' is the volume of the residual space in the general purpose battery and S' is the cross sectional area of the internal space of the cylindrical portion of the battery case B.

Various batteries were assembled using the predetermined positive electrode plate, battery case and seal plate and the above electrolyte. The obtained nickel-metal hydride storage batteries were put through three initial charge/discharge cycles. Charge was performed at 300 mA (0.1 C) for 15 hours, and discharge was performed at 600 mA (0.2 C) for 4 hours. Subsequently, the batteries were subjected to aging at 45° C. for 5 days.

After the above steps, the batteries were charged at 3 A (1 C) for 1.2 hours and discharged at 3 A (1 C) to 1.0 V; thereafter, capacities of all the batteries were measured. Then, batteries having almost the same capacity were selected by ten from the batteries having the same structure, and they were used to constitute a battery assembly having the arrangement shown in FIG. 4. Herein, batteries in the assembly were disposed alternately in opposite direction to facilitate connecting the batteries in series with nickel leads.

Ten batteries were placed in a resin case, each of the batteries was serially connected with a nickel lead wire, and the voltage of the assembly was set at 12 V. In order to prevent short circuits between batteries, insulating paper was disposed in such a manner to cover from the side faces to the sealing portion of each of the batteries for separation of the batteries. Further, in order to control the temperature during the charge, a thermocouple was installed on the wall surface of the battery placed in the center of the lower tier.

The evaluations of the batteries were conducted as follows.

(i) Cycle Life Characteristic

The charge/discharge cycle of the assembly of the obtained batteries was repeated under the following condition to determine the cycle life. The term "cycle life" as referred to herein means the number of cycles when the capacity reaches ½ of the initial capacity.

(a) Atmosphere temperature: 20° C.
(b) Charge condition
Constant current: 4 A
Control condition of −ΔV control mode:
50 mV/10 cells
Control condition of dT/dt control mode:
3° C./min.
Maximum temperature: 60° C.
Rest time after charge: 60 min.
(c) Discharge condition
Constant current: 10 A
Undercut voltage of battery assembly: 2 V
Rest time after discharge: 60 min.

Figure 6:
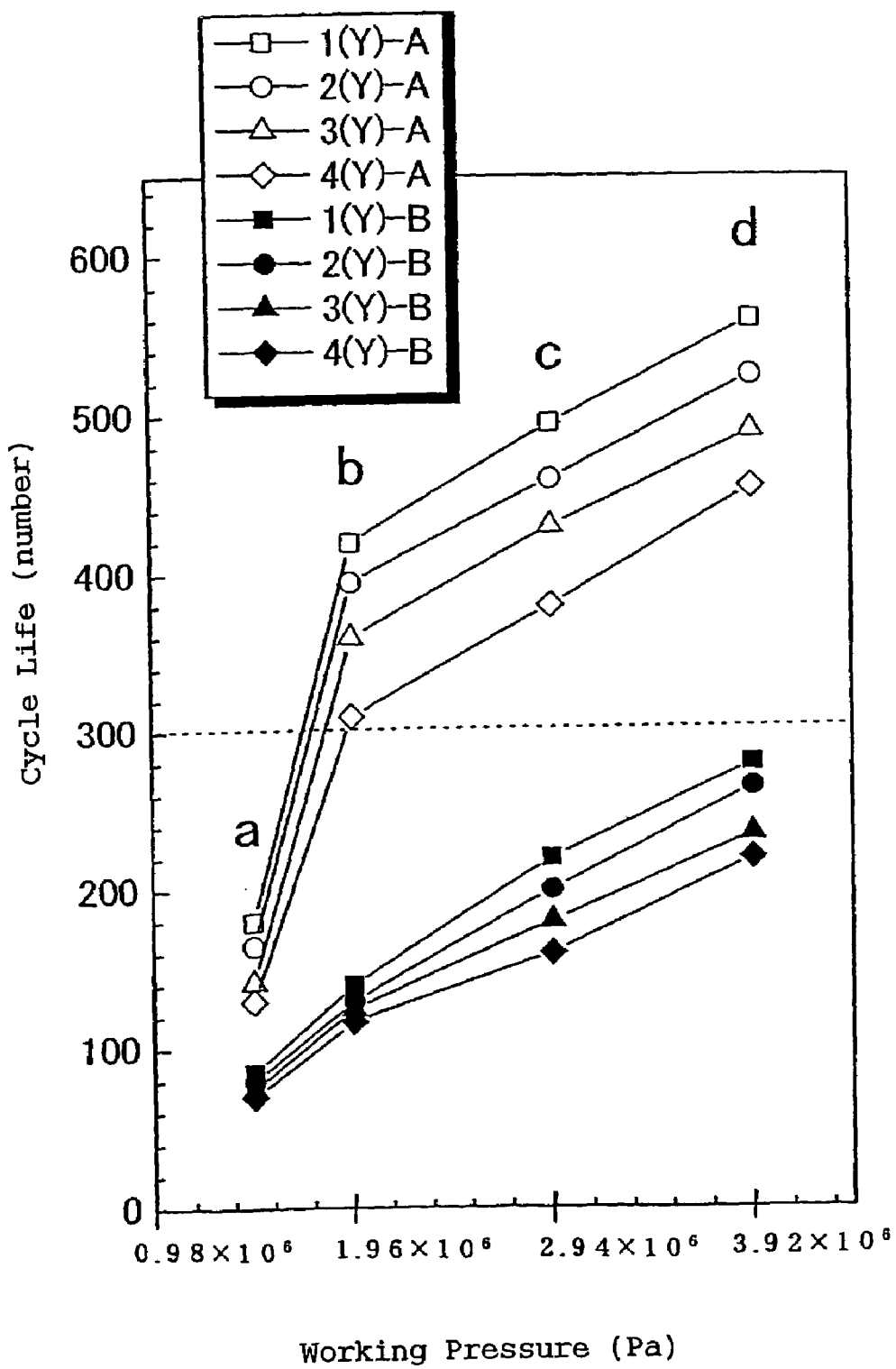
FIG. 6 is a graph showing the relation between a working pressure of a gas exhaustion valve and cycle life of the battery.

The evaluation result of the cycle life characteristic is shown as the relation between the working pressure of the gas exhaustion valve and cycle life in FIG. 6. Here, the battery assemblies using the above-mentioned positive electrode plates 1(Y), 2(Y), 3(Y) and 4(Y) and the battery case A are respectively represented as 1(Y)-A, 2(Y)-A, 3(Y)-A and 4(Y)-A, and the battery assemblies using the above-mentioned positive electrode plates 1(Y), 2(Y), 3(Y) and 4(Y) and the battery case B are respectively represented as 1(Y)-B, 2(Y)-B, 3(Y)-B and 4(Y)-B.

The following tendency became apparent from the result.

First, as to the shape of the battery case, the battery assemblies using the rectangular parallelepiped shaped battery case A have a longer life than those using the cylindrical battery case B. This is considered to be because the rectangular parallelepiped shaped battery case A has a greater volume calculated from the subtraction of the volumes of the electrode plate assembly and the electrolyte from the volume of the space surrounded by the battery case and the seal plate, as compared to the cylindrical battery case B. That is, it is presumed that the increase of the battery internal pressure during overcharge or reverse charge was suppressed because the rectangular parallelepiped shaped battery case A has higher ability to maintain gas.

As to the working pressure of the gas exhaustion valve of the seal plate, the cycle life was understandably improved in the order of a→b→c→d, that is, as the working pressure was set higher. This is presumably because as the working pressure is higher, the increase of the internal pressure during overcharge, or the release of the electrolyte with the increase of the internal pressure during reverse charge resulted from the variation in the charged state of the batteries, is suppressed.

Further, as to the positive electrode plate, in the case of employing the battery case A, the battery assemblies using the positive electrode plates 1(Y), 2(Y), and 3(Y) containing solid solution nickel hydroxide particles whose surface layer comprised cobalt oxide and containing yttrium oxide exhibited excellent results, as compared to the battery assembly using the positive electrode plate 4(Y) containing an active material without the surface layer. Furthermore, preferable results were shown as the cobalt valence of cobalt oxide forming the surface layer was higher. This tendency was not remarkable in the case of employing the cylindrical battery case B.

This is presumably because when the cobalt valence of the surface layer is high, the damage to the conductive network is delayed and the delaying effect becomes remarkable due to the enough residual space in the battery even if the positive electrode plate is exposed to reverse charge or low potential.

EXAMPLE 2

Next, the relation was investigated between the share of the volume V of the residual space in the battery given by the above equation (1) held by the electrolyte and the cycle life of the battery assembly in the case of using the battery case A. There were also produced, in this example, the same positive electrode plates 1(Y), 2(Y), 3(Y) and 4(Y) as those in Example 1. Further, the positive electrode plates 1(N), 2(N), 3(N) and 4(N) having the same structure as that of the positive electrodes 1(Y) to 4(Y) were manufactured except that yttrium oxide particles were not added to the positive electrode plates. These were used to produce battery assemblies in the same manner as in Example 1. However, the amount of the electrolyte was varied and the working pressure of the gas exhaustion valve was set at $3.92 \times 10^6$ Pa.

Figure 7:
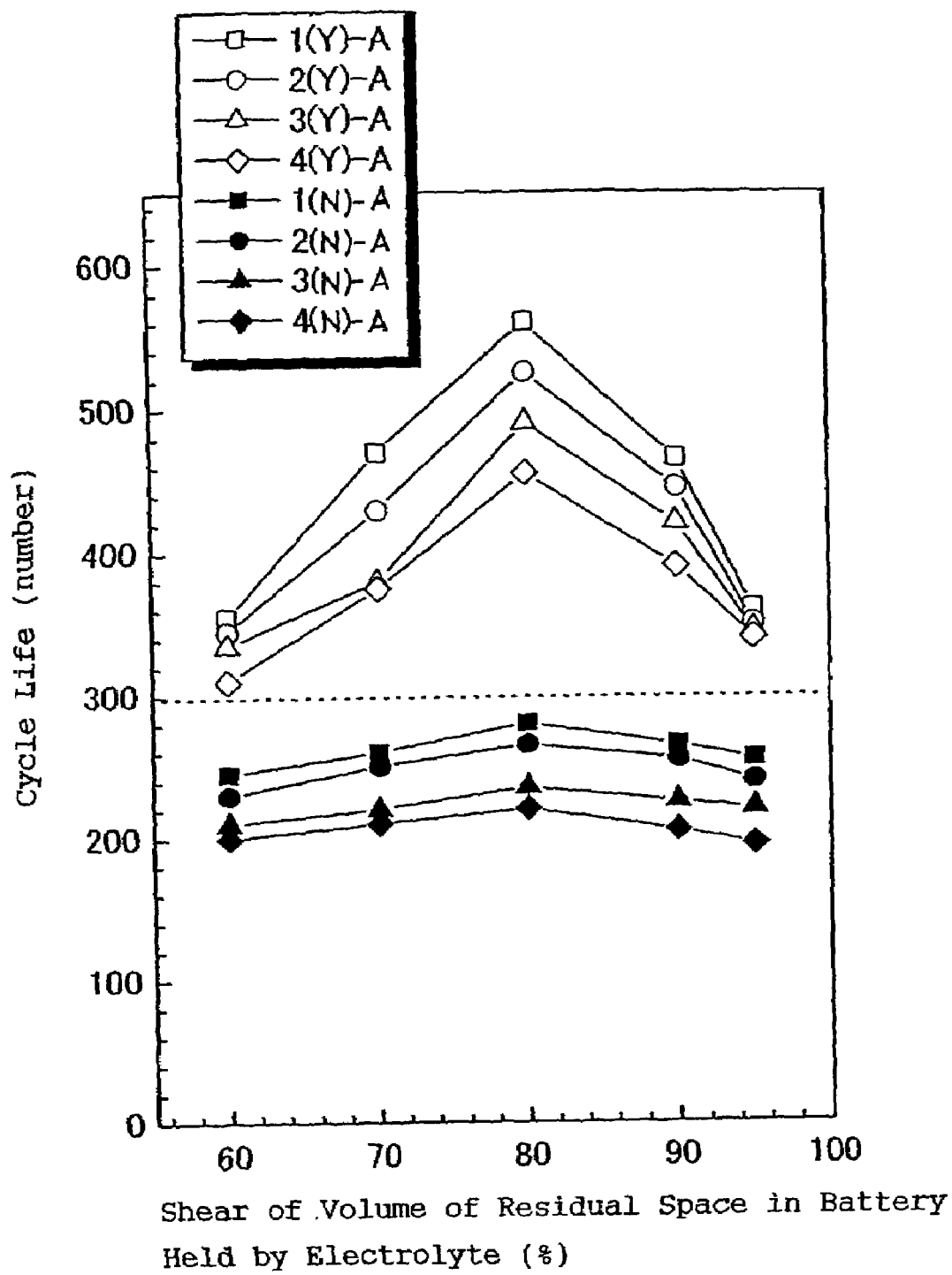
FIG. 7 is a graph showing the relation between the share of the volume V of the residual space in a battery held by an electrolyte and cycle life of the battery.

The cycle life of the assembly of the obtained batteries was determined in the same manner as in Example 1. FIG. 7 shows the relation between the share of the volume V of the residual space in the battery held by the electrolyte and the cycle life. Similar to the above example 1, the battery assemblies using the above-mentioned positive electrode plates 1(Y), 2(Y), 3(Y) and 4(Y) and the battery case A are respectively represented as 1(Y)-A, 2(Y)-A, 3(Y)-A, and 4(Y)-A. Further, the battery assemblies using the above-mentioned positive electrodes 1(N), 2(N), 3(N) and 4(N) and the battery case A are respectively represented as 1(N)-A, 2(N)-A, 3(N)-A and 4(N)-A.

As apparent from FIG. 7, the cases of using the positive electrode plates 1(Y), 2(Y), 3(Y) and 4(Y) containing yttrium oxide particles have more excellent cycle life characteristics, as compared to the cases of using the positive electrode plates 1(N), 2(N), 3(N) and 4(N) without yttrium oxide particles.

Then, the effect obtained by adding yttrium oxide to the positive electrode plate is explained referring to FIG. 8. FIG. 8 shows the relation between the ambient temperature and the charge efficiency of the battery (I) with the positive electrode plate without yttrium oxide and the battery (II) with the positive electrode plate containing yttrium oxide. Incidentally, the charge efficiency of the positive electrode plate is shown in the ratio (%) of the charge capacity of the battery charged at various ambient temperatures to the charge capacity of the battery (II) charged at an ambient temperature of 20° C.

When a variation occurs in a range K of the ambient temperature of the battery, variations of charge efficiency occur in a range L for the battery (I) and in a range M for the battery (II). The variation of the charge efficiency leads to the variation of the capacity characteristic, and some batteries in the battery assembly locally go into an overdischarged state and are reversely charged, resulting in degradation thereof. Yttrium oxide reduces the above-mentioned disadvantage.

FIG. 7 shows that the results are preferable in the order of the positive electrode plates 1(Y), 2(Y) and 3(Y), that is, the higher the cobalt valence of the cobalt oxide which forms the surface layer is, the more preferable the results become. This is presumably because the damage to the conductive network is suppressed or delayed even in the battery which is in a reversely charged state. Furthermore, the cycle life characteristic is particularly excellent when the share of the residual space in the battery held by the electrolyte is in a range of 70 to 90%.

Though not shown in the figure, similar tendency was seen that the effect to improve cycle life becomes remarkable in the battery with the share of the residual space in the battery held by the electrolyte of 70 to 90% in the case of using the seal plate with the working pressure of the gas exhaustion valve set as low as $2.94 \times 10^6$ or $1.96 \times 10^6$ Pa.

These results show that the addition of yttrium oxide particles is important even when the surface of the solid solution nickel hydroxide particles are covered with cobalt hydroxide or cobalt oxide. At the same time, these results also show that the sufficient effect of the yttrium oxide particles can be obtained by using a battery case giving enough residual space in the battery such as the battery case A and restricting the share of the residual space in the battery held by the electrolyte to 70 to 90%. This synergistic effect is a phenomenon that cannot be seen in conventional battery structures where a spirally and tightly wound electrode plate assembly is put in a cylindrical battery case.

It is surmised that the batteries used as an assembly for power tools need to have about 300 cycles or more of cycle life characteristic even when the capacity is used up by a continuous discharge at a large current like above. Summing up the results of Examples 1 and 2, in order to meet this requirement, it is necessary to put the electrode plate assemblies produced by using a positive electrode plate like the positive electrode plates 1(Y), 2(Y) and 3(Y) in a battery case like the battery case A and to set the share of the residual space in the battery held by the electrolyte at 70 to 90%.

From the above points, it has become apparent that a nickel-metal hydride storage battery comprising (i) an electrode plate assembly comprising: a positive electrode plate comprising spherical nickel hydroxide particles having cobalt oxide on the surface thereof, yttrium oxide particles and a porous nickel substrate retaining both of the particles; a negative electrode plate containing a hydrogen storage alloy; a separator interposed between the positive and negative electrode plates, in which the electrode plates and the separator are spirally wound; and current collectors of one polarity and the other polarity being located respectively on the top and bottom of the spirally wound electrode plates and separator, (ii) an alkaline electrolyte and (iii) a battery case having a substantially rectangular parallelepiped part for accommodating the electrode plate assembly and the alkaline electrolyte, wherein the amount of the alkaline electrolyte is 70 to 90% of the volume V of the residual space in the battery given by the equation (1):

$$V = S \cdot h - (V1 + V2 + V3 + V4) \tag{1}$$

where S is the cross sectional area of the inner space of the substantially rectangular parallelepiped part, h is the height of the electrode plate assembly, V1 is the true volume of the positive electrode plate, V2 is the true volume of the negative electrode plate, V3 is the true volume of the separator, and V4 is the volume of the two current collectors, has an excellent adaptability to power tools which perform hard charge/discharge cycles.

It also has become apparent that 300 cycles or more of cycle life characteristic can be ensured if the working pressure of the gas exhaustion valve of the seal plate is set at $1.96 \times 10^6$ or more. Further, it has become apparent that the higher the working pressure is set, the more the cycle life characteristic is improved. In batteries adopting the crimp-sealing, however, it is practically very difficult to perform the sealing which can bear the pressure over $4.0 \times 10^6$ Pa; therefore, it can be said that the practical range of the working pressure of the gas exhaustion valve is $1.9 \times 10^6$ to $4.0 \times 10^6$ Pa.

It should be noted that the present invention is not limited to the matters described in Examples, as long as based on the basic structure of the present invention. For instance, although solid solution particles containing zinc and cobalt was used as the spherical nickel hydroxide particles in Examples, the same nickel-metal hydride storage battery can be produced using magnesium, instead of zinc. In that case, magnesium nitrate or magnesium sulfate may be used instead of zinc sulfate when the solid solution is synthesized.

As described above, the preferred embodiment of the present invention can solve the problem of capacity degradation due to deep discharge and reverse discharge inherent to nickel-metal hydride storage batteries used as an assembly. It can also significantly improve the cycle life characteristic of nickel-metal hydride storage batteries for power tools, for instance.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A nickel-metal hydride storage battery comprising
    (i) an electrode plate assembly comprising: a positive electrode plate comprising spherical nickel hydroxide particles having cobalt oxide on the surface thereof, yttrium oxide particles and a porous nickel substrate retaining both of said particles; a negative electrode plate containing a hydrogen storage alloy; a separator interposed between said positive and negative electrode plates, said electrode plates and said separator being spirally wound; and current collectors of one polarity and the other polarity being located respectively on the top and bottom of said spirally wound electrode plates and separator,
    (ii) an alkaline electrolyte and
    (iii) a battery case having a substantially rectangular parallelepiped part for accommodating said electrode plate assembly and said alkaline electrolyte,
    the amount of said alkaline electrolyte being 70 to 90% of the volume V of the residual space in said battery given by the equation (1):

$$V = S \cdot h - (V1+V2+V3+V4) \quad (1)$$

where S is the cross sectional area of the inner space of said substantially rectangular parallelepiped part, h is the height of said electrode plate assembly, V1 is the true volume of said positive electrode plate, V2 is the true volume of said negative electrode plate, V3 is the true volume of said separator, and V4 is the volume of said two current collectors; and
    wherein said battery case comprises a bottomed case having a circular opening, and said opening is sealed with a disc-shaped seal plate, the edge of said opening crimping onto the periphery of said seal plate.

2. The nickel-metal hydride storage battery in accordance with claim 1, equipped with a gas exhaustion valve with a working pressure of $1.9 \times 10^6$ to $4.0 \times 10^6$ Pa.

3. The nickel-metal hydride storage battery in accordance with claim 1, wherein the amount of said cobalt oxide is 2 to 15 parts by weight per 100 parts by weight of said nickel hydroxide.

4. The nickel-metal hydride storage battery in accordance with claim 1, wherein the amount of said yttrium oxide particles is 0.5 to 5.0 parts by weight per 100 parts by weight of said spherical nickel hydroxide particles having said cobalt oxide on the surface thereof.

5. The nickel-metal hydride storage battery in accordance with claim 1, wherein said cobalt oxide is at least one selected from the group consisting of cobalt oxide having a cobalt valence of 2.0 or more and cobalt hydroxide.

6. The nickel-metal hydride storage battery in accordance with claim 1, wherein said cobalt oxide comprises cobalt oxide having a cobalt valence over 3.0.

7. A nickel-metal hydride storage battery comprising
    (i) an electrode plate assembly comprising: a positive electrode plate comprising spherical nickel hydroxide particles having cobalt oxide on the surface thereof, yttrium oxide particles and a porous nickel substrate retaining both of said particles; a negative electrode plate containing a hydrogen storage alloy; a separator interposed between said positive and negative electrode plates, said electrode plates and said separator being spirally wound; and current collectors of one polarity and the other polarity being located respectively on the top and bottom of said spirally wound electrode plates and separator,
    (ii) an alkaline electrolyte and
    (iii) a battery case having a substantially rectangular parallelepiped part for accommodating said electrode plate assembly and said alkaline electrolyte,
    the amount of said alkaline electrolyte being 70 to 90% of the volume V of the residual space in said battery given by the equation (1):

$$V = S \cdot h - (V1+V2+V3+V4) \quad (1)$$

where S is the cross sectional area of the inner space of said substantially rectangular parallelepiped part, h is the height of said electrode plate assembly, V1 is the true volume of said positive electrode plate, V2 is the true volume of said negative electrode plate, V3 is the true volume of said separator, and V4 is the volume of said two current collectors; wherein the cross section of said substantially rectangular parallelepiped part has a substantially square outer shape with four curved or chamfered corners, and r/a ratio is 0.40 or less when the distance between opposite sides of said substantial square is represented by a and the length of a straight segment of said side is represented by a−2r.

8. An assembly comprising a plurality of nickel-metal hydride storage batteries, each of said batteries comprising (i) an electrode plate assembly comprising: a positive electrode plate comprising spherical nickel hydroxide particles having cobalt oxide on the surface thereof, yttrium oxide particles and a porous nickel substrate retaining both of said particles; a negative electrode plate containing a hydrogen storage alloy; a separator interposed between said positive and negative electrode plates, said electrode plates and said separator being spirally wound; and current collectors of one polarity and the other polarity being located respectively on the top and bottom of said spirally wound electrode plates and separator, (ii) an alkaline electrolyte and (iii) a battery case having a substantially rectangular parallelepiped part for accommodating said electrode plate assembly and said alkaline electrolyte, the amount of said alkaline electrolyte being 70 to 90% of the volume V of the residual space in said battery given by the equation (1):

$$V = S \cdot h - (V1 + V2 + V3 + V4) \tag{1}$$

where S is the cross sectional area of the inner space of said substantially rectangular parallelepiped part, h is the height of said electrode plate assembly, V1 is the true volume of said positive electrode plate, V2 is the true volume of said negative electrode plate, V3 is the true volume of said separator, and V4 is the volume of said two current collectors, said batteries arranged such that at least one side face of each of said batteries faces a side face of another one of said batteries; and wherein said battery case comprises a bottomed case having a circular opening, and said opening is sealed with a disc-shaped seal plate, the edge of said opening crimping onto the periphery of said seal plate.

* * * * *

UNITED STATES PATENT AND TRADEMARK OFFICE
CERTIFICATE OF CORRECTION

PATENT NO. : 6,958,200 B2
DATED : October 25, 2005
INVENTOR(S) : Fumio Kato et al.

It is certified that error appears in the above-identified patent and that said Letters Patent is hereby corrected as shown below:

<u>Title page,</u>
Item [56], References Cited, U.S. PATENT DOCUMENTS, "6,038,642" should read -- 6,083,642 --.

Signed and Sealed this

Fourth Day of April, 2006

JON W. DUDAS
*Director of the United States Patent and Trademark Office*